(12) United States Patent
Yao (10) Patent No.: US 6,576,886 B1
(45) Date of Patent: Jun. 10, 2003

(54) DYNAMIC CONTROL OF POLARIZATION OF AN OPTICAL SIGNAL

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 09/683,825

(22) Filed: Feb. 20, 2002

Related U.S. Application Data

(60) Provisional application No. 60/270,253, filed on Feb. 20, 2001.

(51) Int. Cl.[7] .................................................. H01J 40/14
(52) U.S. Cl. ........................................ 250/225; 356/368
(58) Field of Search ................................ 250/225, 216, 250/205, 206, 214 R; 356/453, 491, 487, 364, 367, 368; 359/281, 282, 283

(56) References Cited

U.S. PATENT DOCUMENTS 6,373,614 B1 * 4/2002 Miller ........................ 359/237

* cited by examiner

*Primary Examiner*—Que T. Le
(74) *Attorney, Agent, or Firm*—Fish & Richardson P.C.

(57) ABSTRACT

Techniques for dynamically controlling polarization of an optical signal by combining both feed-forward and feedback controls.

20 Claims, 8 Drawing Sheets

DYNAMIC CONTROL OF POLARIZATION OF AN OPTICAL SIGNAL

CROSS REFERENCE TO RELATED APPLICATIONS

This application claims the benefit of U.S. Provisional Application No. 60/270,253 filed Feb. 20, 2001, the disclosure of which is incorporated herein by reference.

BACKGROUND OF INVENTION

This application relates to optical polarization, and more specifically, to techniques and systems for controlling a state of polarization of an optical signal.

Various optical devices and systems can be sensitive to the state of polarization of an optical signal to be processed or transmitted. For example, certain coherent optical processing may require a match between the states of polarization of two separate optical beams when the two beams are superposed. For another example, a birefringent optical element may attenuate an optical signal differently when the polarization of the signal forms different angles with respect to a given principal axis of polarization of the element. An optical amplifier with a saturable gain medium may also produce a polarization-dependent gain when a polarization component with a high intensity saturates the gain medium and hence experiences an optical gain less than that of another, weaker polarization component. Furthermore, certain optical modulators may produce different modulation depths on optical signals with different polarizations. Semiconductor electro-absorption modulators and electro-optical modulators based on birefringent crystals such as lithium niobate are examples of such modulators. Hence, it is generally desirable to control the polarization of an optical signal in those and other polarization-sensitive devices and systems.

The polarization of an optical signal may not be static but dynamically vary with time in some optical systems due to various fluctuations or changes in some parts of the systems such as light sources, optical components, and optical transmission media. For example, some optical fibers may be birefringent to exhibit different refractive indices for different polarizations. Typical causes for this fiber birefringence include, among others, imperfect circular cores, and unbalanced stress in a fiber along different transverse directions. Fluctuations in local temperature and stress along a fiber line, therefore, may randomly change the axis of birefringence of the optical fiber at different locations. The polarization of light transmitting through such a fiber, therefore, may also fluctuate with time and cause polarization-mode dispersion (PMD) in optical signals with two orthogonal principal polarization states.

Accordingly, it may be desirable that a polarization control mechanism be dynamic so that it may change its control in response to any variation in the input polarization of light and therefore maintain or set the output polarization at a desired state. Some dynamic polarization control devices implement an adjustable polarization module that manipulates the polarization of light, and a polarization analyzer that measures any deviation of the actual output polarization from the polarization module from a desired output polarization. The adjustable polarization module may include multiple adjustable polarization elements, e.g., rotatable waveplates or adjustable fiber squeezers engaged to a fiber, to control the output polarization based on adjustable optical birefringence. A feedback control loop may be used to control the polarization elements in the adjustable polarization module to correct any variations in the input polarization based on the measured deviation from the polarization analyzer.

SUMMARY OF INVENTION

The present disclosure includes a control mechanism for dynamically controlling the multiple polarization elements in the adjustable polarization module by implementing two control mechanisms: a feed-forward control and a feedback control. In one embodiment, the feed-forward control measures the input polarization of the input signal and adjusts the multiple polarization elements to pre-determined settings for producing the desired output polarization. The feedback control adjusts the multiple polarization elements around the settings initially set by the feed-forward control to reduce the measured deviation of the output polarization of the adjustable polarization module. In another embodiment, the feed-forward control is engaged to control at least two polarization elements while the feedback control is engaged to control at least two polarization elements that are not engaged to be controlled by the feed-forward control.

To certain extent, the feed-forward control essentially provides a fast, coarse control of some or all of the polarization elements in response to the input polarization and the feedback control essentially fine tunes the settings of some or all of the polarization elements to reduce the deviation of the output polarization from a desired output polarization.

DETAILED DESCRIPTION

The techniques of the present disclosure are in part based on the recognition that, a feedback control alone may be inefficient or slow in controlling multiple polarization elements that operate in combination to control or maintain the output polarization at a desired polarization. Such a feedback control in some implementations relies on the output polarization produced by the multiple polarization elements to adjust the settings of the multiple polarization elements. In general, a setting in each polarization element may be adjustable only within a limited tuning range. Hence, as the input polarization drifts or fluctuates, the adjustment of one or more polarization elements may reach their respective limits in an attempt to maintain the output polarization at the desired state. When this occurs, an out-of-range polarization element must be reset to a setting within its tuning range and the combined configuration of the multiple polarization elements must be readjusted in order to lock the output polarization at the desired state.

Hence, the above resetting of one or more polarization elements in the feedback control can be a slow process and therefore, the output polarization may not be at the desired state during the reset period. This may be undesirable in a polarization-sensitive application where a component, device, or system may perform unsatisfactorily or even fail during the reset period.

It is further recognized that, the above drawback of the feedback control is partially due to the reactive nature of the feedback control. The feedback control does not have or does not respond to information on the input polarization received by the multiple polarization elements. Instead, it controls the polarization elements based on the output polarization to correct the error in the output polarization.

In recognition of the above, the present disclosure implements a feed-forward control and combines the feed-forward control and the feedback control to provide a highly-accurate and high-speed polarization control mechanism. This system may be configured to essentially eliminate the resetting of the polarization elements by using the feed-forward control to maintain the setting of each polarization element within its tuning range. In addition, the present technique may also be used to mitigate device inaccuracies such as hysteresis and device parameter drifts due to aging and environmental factors.

Figure 1:
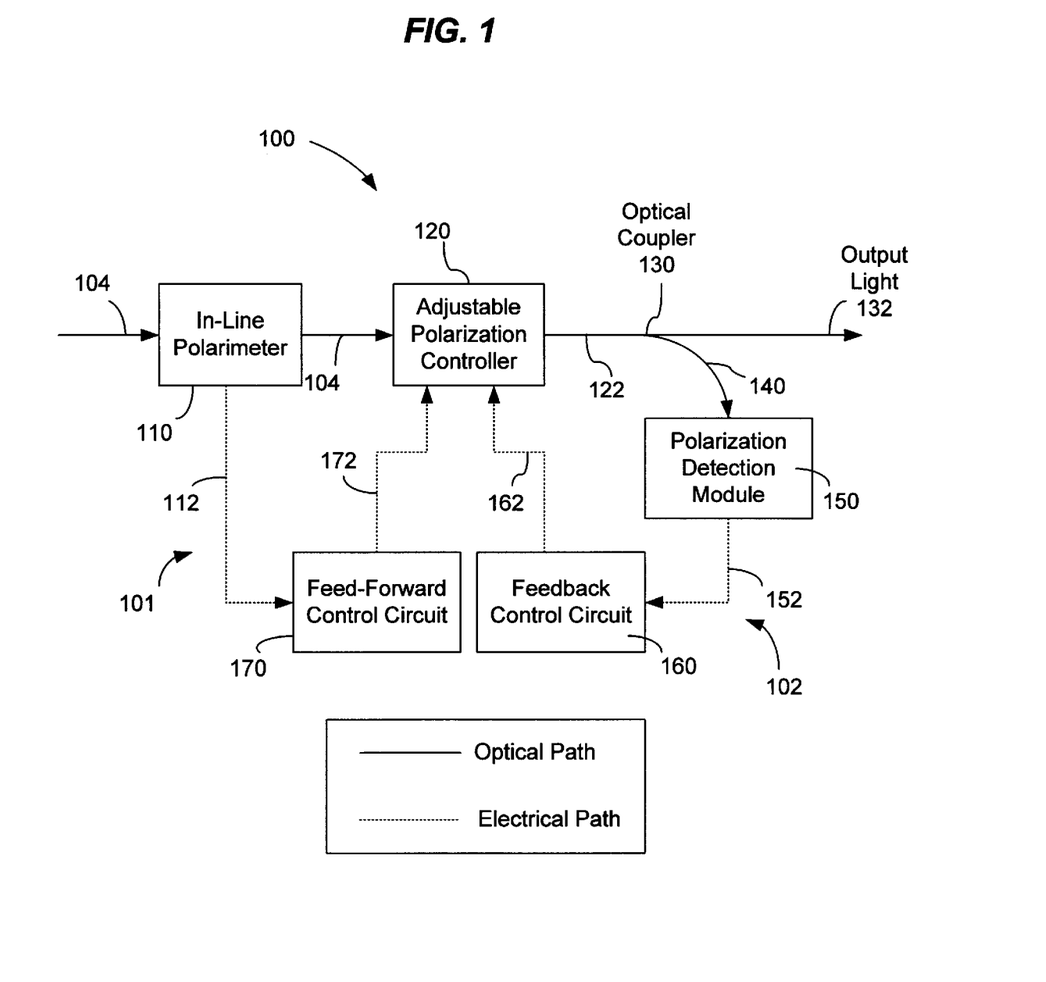
FIG. 1 shows one embodiment of a dynamic polarization control of the present disclosure.

FIG. 1 shows one embodiment of this polarization control system 100. An adjustable polarization controller 120 is used to receive an input optical signal 104 and to produce an output optical signal 122 at a desired polarization. The polarization controller 120 includes two or more adjustable polarization elements to modify the polarization of the input signal 104. Each polarization element may be optically birefringent and use its birefringence to modify the polarization of light passing therethrough. The polarization elements may be optically cascaded in series within the controller 120. A feed-forward control loop 101 and a feedback control loop 102 are used to control the polarization elements in the polarization controller 150.

The feed-forward control loop 101 includes an input polarization detection module 110 and a feed-forward control circuit 170. The polarization detection module 110 measures the state of the input polarization of the input optical signal 104. This module 110 may be an in-line polarimeter which transmits a received optical signal and measures its polarization at the same time without altering the input polarization. Alternatively, the module 110 may be a polarimeter that destroys the polarization upon measuring the polarization. Such a polarimeter may be coupled in the system out of the main optical path to receive a fraction of the input signal 104 by using an optical coupler or splitter in the path of the input beam 104 to tap the input signal 104 so that the majority of the input signal 104 continues to propagate to the polarization controller 120. The module 110 produces an electrical output signal 112 that indicates the state of input polarization of the input 104.

The feed-forward control circuit 170 is coupled to the module 110 to receive the signal 112. It may have a look-up table with different setting combinations for the polarization elements in the controller 120 that convert all possible states of polarization of the input signal 104 into one or more desired polarization states of the output 122. In each setting combination, the setting for each polarization element is within its corresponding tuning range with a sufficient room for adjustment. Preferably, the setting may be set at or near the middle point of the tuning range to provide a maximum tuning range. This look-up table may be stored in the feed-forward control circuit 170.

When the signal 112 is received from the module 112, the feed-forward control circuit 170 looks up the corresponding combination setting from the look-up table for converting the measured polarization indicated by the signal 112 into the desired polarization. A control command 172 to the polarization controller 120 is then generated by the circuit 170 to set the polarization elements in the polarization controller 120 according to the selected setting combination. The look-up table is predetermined based on calibration and is stored in the circuit 170. The feed-forward control circuit 170 does not need to perform complex computation. Hence, the feed-forward control loop 101 can quickly respond to the measurement in the signal 112 to properly set the multiple polarization elements in the controller 120.

The above operation of the feed-forward control loop 101 provides a coarse tuning mechanism for setting the polarization elements in the controller 120. The feed-forward control loop 101, however, does not know whether the polarization of the output signal 122 is in fact at the desired polarization. The feedback control loop 102 is designed to check the polarization of the output signal 122 and fine tunes the polarization elements to reduce any inaccuracy in the coarse setting produced by the feed-forward control loop 101 and any variations caused by fluctuations or drifts in the polarization of the input signal 104.

The feedback control loop 102 includes a polarization detection module 150 and a feedback control circuit 160. The polarization detection module 150 may be placed in or out of the path of the output signal 122. As illustrated, when the module 150 is placed out of the path of the signal 122, an optical coupler or splitter 130 may be used to tap a fraction of the output signal 122 to produce a monitor beam 140 as the input to the polarization detection module 150. A polarimeter or a polarization analyzer formed of a linear polarizer and a photodetector may be used as the module 150. A deviation of the polarization of the output signal 122 from the desired polarization is measured by the module 150 and is included in an error signal 152 to the feedback control circuit 160. The feedback control circuit 160 then initiates an adjustment routine to fine tune the settings of the polarization elements in the controller 120 to reduce that measured deviation.

In operation, the feed-forward control 101 resets the settings of the polarization elements in controller 120 whenever the input polarization changes based on the predetermined look-up table. Hence, a polarization element under the control of the feed-forward control 101 can be kept within its tuning range without the need for resetting operation. The feedback control 102, on the other hand, may operate independently with respect to the feed-forward control 101 to fine tune the controller 120 and maintain the output polarization at the desired state.

Figure 2:
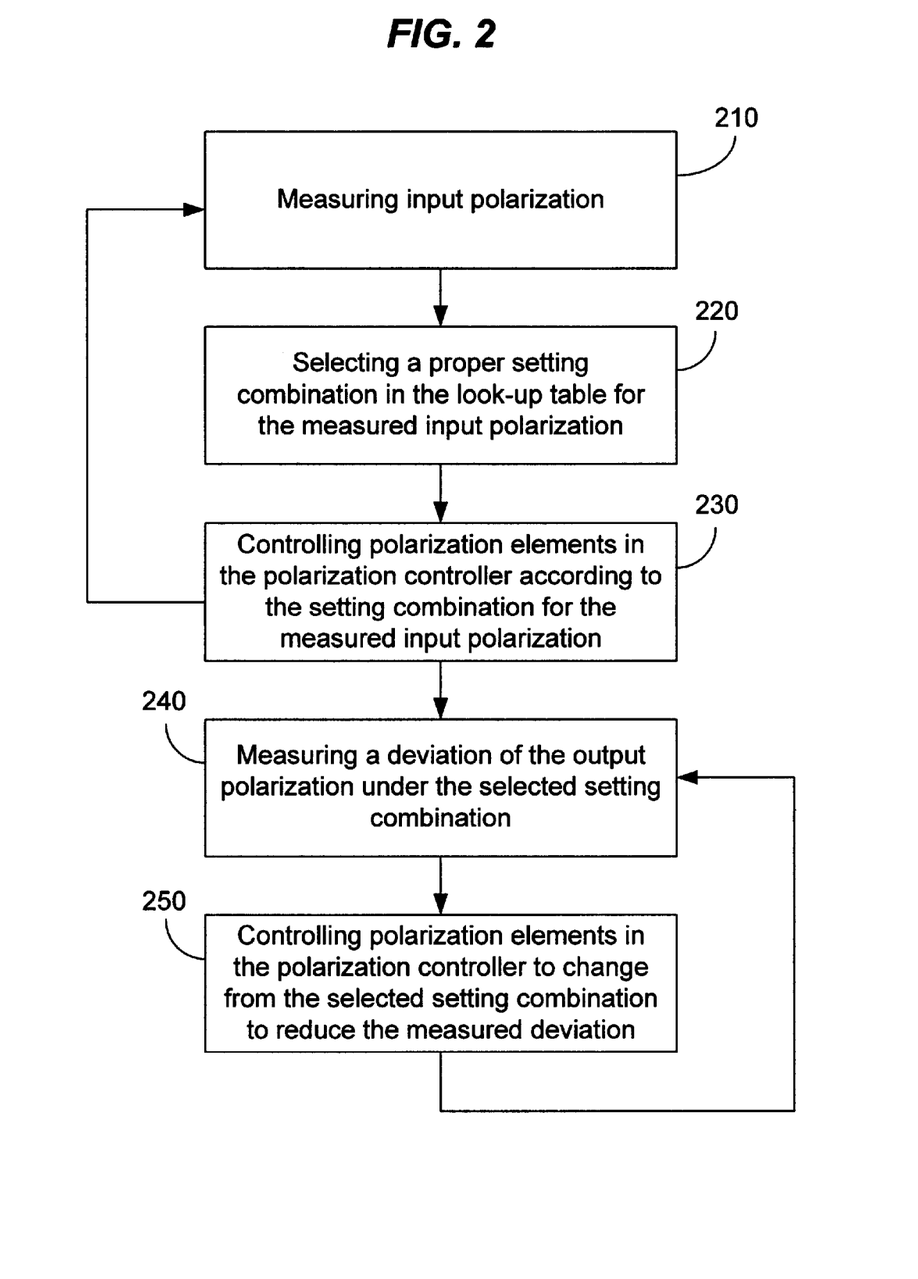
FIG. 2 shows one embodiment of the operational flow of the system in FIG. 1.

FIG. 2 shows one embodiment of the operational flow of the feed-forward control 101 and feedback control 102 shown in FIG. 1. At step 210, the input polarization is measured. Step 220 selects from a look-up table a proper predetermined setting combination of settings for the polarization elements in the controller 120 for producing a desired output polarization. In implementation, all polarization elements in the controller 120 may be adjusted to a predetermined setting combination based on the input polarization. Alternatively, only two polarization elements in the controller 120 may be set to a predetermined setting combination to control the polarization to the desired output and the remaining polarization elements may be controlled according to the polarization output of the whole controller 120 as shown in steps 240 and 250. At step 240, the output polarization from the controller 120 is measured and compared to the desired output polarization to determine the deviation. Based on this measured deviation of the output, all polarization elements in the controller 120 may be adjusted to change from the predetermined setting combination to reduce the measured deviation (step 250). When only part of the polarization elements in the controller 120 are designed to be adjusted based on the measured deviation in the output polarization, then only such designated polarization elements are adjusted in step 250 while settings of other polarization elements remain unchanged. The above feed-forward control based on the input polarization and the feedback control based on the output polarization operate collectively to control the output polarization.

Figure 3A:
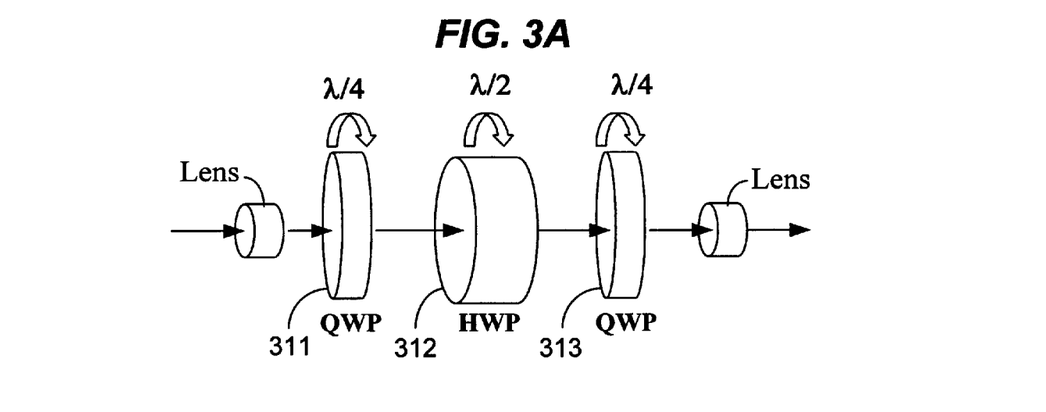
FIGS. 3A, 3B, 3C, 4A, 4B, 5A, and 5B show examples of the adjustable polarization controller in the system of FIG. 1 that has two or more adjustable polarization elements.
Figure 3B:
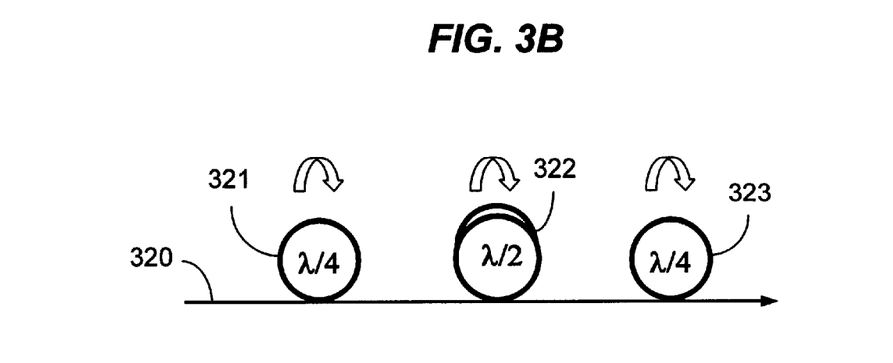
Figure 3C:
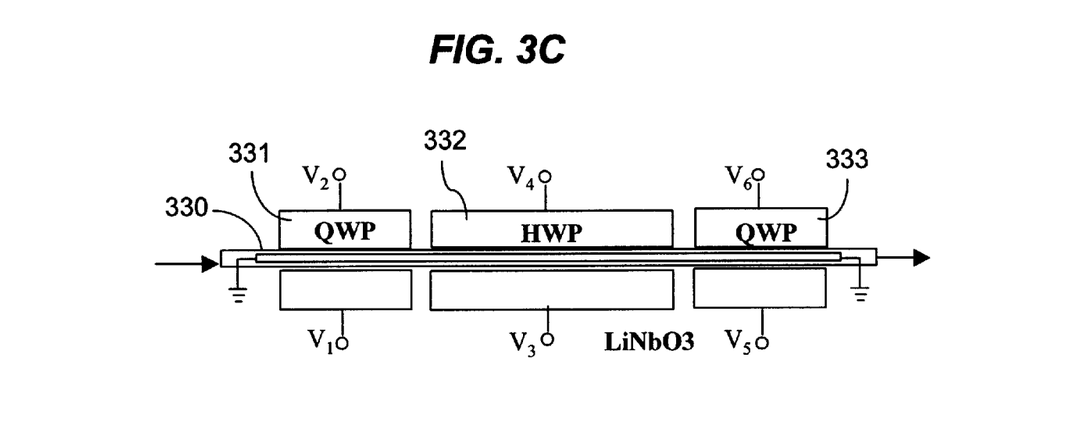

The multi-element polarization controller 120 may be implemented in various configurations. FIGS. 3A through 5B show some examples. FIGS. 3A through 3B show implementations with three cascaded rotatable waveplates of fixed phase retardation values of 90 degrees, 180 degrees, and 90 degrees, respectively. In FIG. 3A, a half waveplate (HWP) 312 is placed between two quarter waveplates (QWP) 311 and 313 in free space to form the controller 120. Two lenses may be respectively placed at the input and out sides of the waveplate combination for collimation and coupling to input and output fibers. FIG. 3B shows a fiber implementation in a fiber 320 where fiber coils 321, 322, and 323 are birefringent to produce the fixed retardation values of 90 degrees, 180 degrees, and 90 degrees, respectively. Bending of the fiber in each coil introduces stress and thus causes birefringence. The number of turns (length of the light propagation) and the diameter of the each fiber coil (degree of bending) can be set to produce the corresponding fixed phase retardation. The fiber coils 321, 322, and 323 may be rotatable as illustrated to change their relative orientations in their principal axes to adjust the output polarization. I yet another alternative, electro-optic materials 331, 332, and 333 may be used to produce the fixed retardation values of 90 degrees, 180 degrees, and 90 degrees, respectively. Electro-optic crystals such as LiNbO$_3$ may be used. A waveguide 330 is formed in the electro-optic materials to direct the light. Unlike the systems in FIGS. 3A and 3B where each polarization element is physically rotated for adjusting the polarization, the system in FIG. 3C may be designed to eliminate physical motion of the polarization elements 331, 332, and 333. In the embodiment as illustrated, each electro-optic polarization element is applied with two control voltages to control and rotate the orientations of their optic axes via the electro-optic effect without physical rotations of the elements. This approach may be used to achieve a high-speed modulation with response times generally shorter than those of the systems in FIGS. 3A and 3B.

Figure 4A:
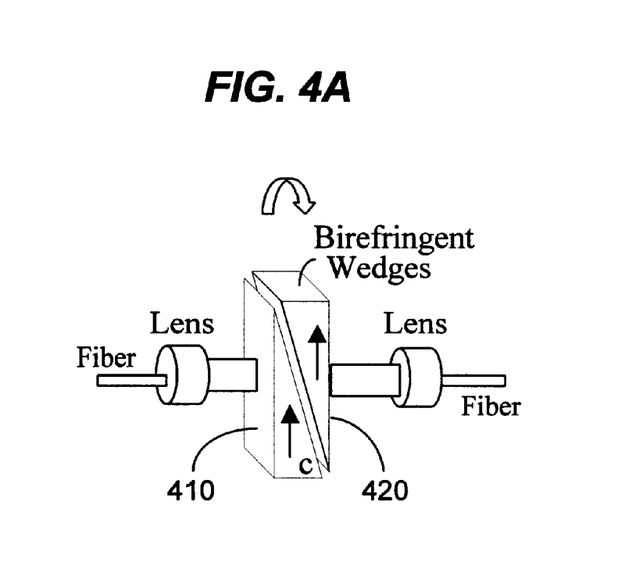
Figure 4B:
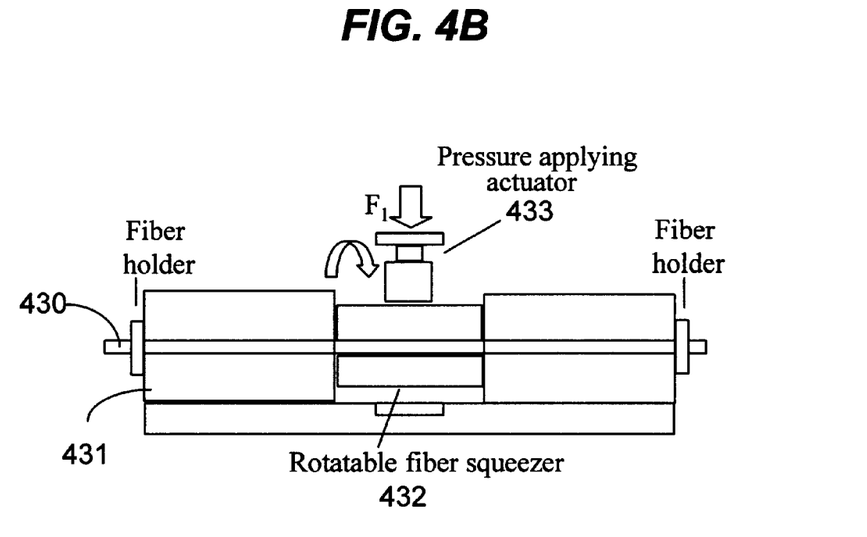

FIGS. 4A and 4B show two implementations of the controller 120 based on the Babinet-Soleil compensator to produce both adjustable retardation and adjustable orientation. Two movable birefringent wedges 410 and 420 are positioned in FIG. 4A so that their hypotenuse surfaces face each other. The input optical beam is directed to transmit through the hypotenuse surfaces of two wedges 410 and 420. The total optical path length through the wedges 410 and 420 and thus the total retardation of the system may be varied by moving two wedges 410 and 420 relative to each other. A linear positioning mechanism may be used to change the relative position of the wedges 410 and 420. The two wedges 410 and 420 may also be rotated together about the direction of the input optical beam to provide the adjustable orientation by a rotation mechanism. In one implementation of the feedback and feed-forward controls, the relative position of one wedge with respect to another and the orientation of the two wedges may be controlled by the feed-forward and feedback controls 101 and 102.

FIG. 4B shows a fiber polarization controller based on the basic mechanism of the Babinet-Soleil compensator. A fiber 430 is held to a base 431. A rotatable fiber squeezer 432 is rotatably engaged to the fiber 430 on the base 431 so that the direction at which the squeezer 432 squeezes the fiber 430 can be adjusted. The squeezing produces birefringence in the fiber 430 to control the light polarization. A pressure-applying transducer 433, such as a piezo-electric transducer, may be engaged to the squeezer 432 to produce a variable pressure and hence a variable birefringence in the fiber 430. In some implementations, the squeezer 432 and the transducer 433 may be integrated as a single element. The pressure to the fiber 430 and the rotation angle of the squeezer 431 about the fiber 430 may be controlled by the by the feed-forward and feedback controls 101 and 102.

Figure 5A:
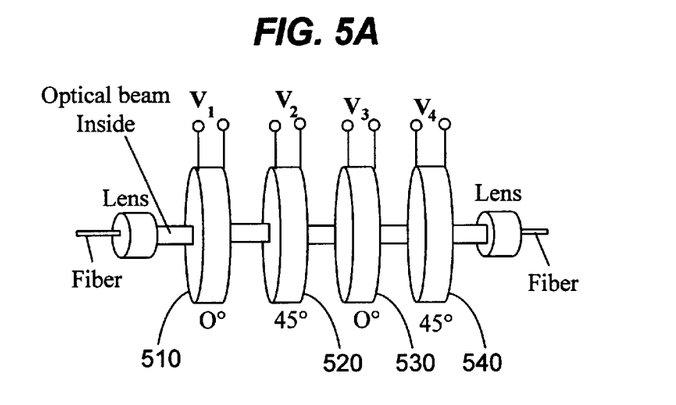
Figure 5B:
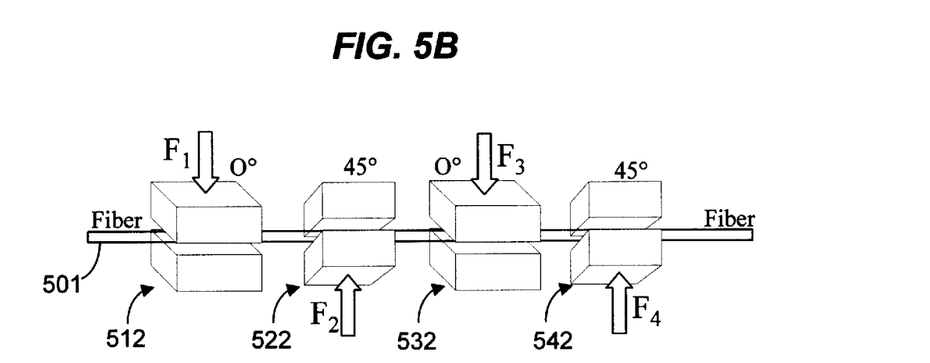

FIGS. 5A and 5B show implementations of the controller 120 having four or more adjustable polarization elements with fixed relative orientations and variable birefringences. In the illustrated example, the principal polarizations of two adjacent elements are at about 45 degrees relative to each other. FIG. 5A shows the implementation with four waveplates 510, 520, 530, and 540 whose retardation values change in response to external control signals such as applied voltages. The directions of the same principal polarization axis such as the slow axis of the four waveplates 510, 520, 530, and 540 may be at 0 degree, 45 degree, 0 degree, and 45 degree, respectively. Electro-optic materials and liquid crystals may be used. Two collimation lenses may be used to couple the system to input and output fibers.

FIG. 5B shows an all-fiber implementation in which a fiber 501 is engaged to four fiber squeezers 512, 522, 532, and 542 whose squeezing directions are fixed at angles of 0 degree, 45 degree, 0 degree, and 45 degree, respectively. The pressure on each squeezer may be adjusted to change the retardation produced thereby. Such an all-fiber design may be used to reduce the optical insertion loss as compared to other designs and may be used to operate on light of different wavelengths.

Figure 6:
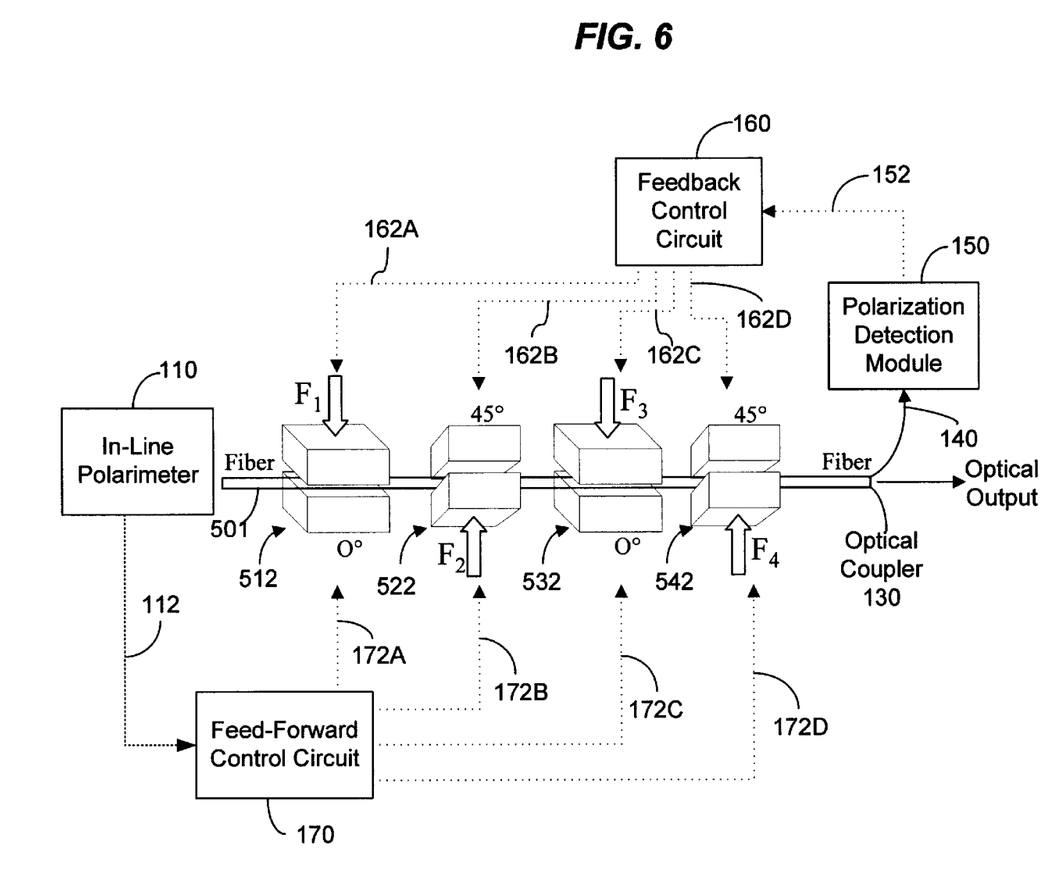
FIGS. 6, 7A, and 7B show exemplary configurations for engaging the feedback and feed-forward control loops to polarization elements.

Referring back to FIG. 1, the feed-forward control 101 and the feedback control 102 may be used in different configurations. In one embodiment, for example, each adjustable polarization element in the controller 120 may be controlled by both the feed-forward control 101 and the feedback control 102. FIG. 6 illustrates one implementation of this based on the controller shown in FIG. 5B, where the feed-forward control circuit 170 produces separate controls signals 172A, 172B, 172C, and 172D in response to the input polarization to control the polarization elements 512, 522, 532, and 542, respectively, and the feedback control circuit 160 produces separate controls signals 162A, 162B, 162C, and 162D in response to the measured output polarization to control the polarization elements 512, 522, 532, and 542, respectively. Hence, each element is first set by the feed-forward control 101 whenever the input polarization changes and then is fine tuned by the feedback control 102 in response to measured output polarization to reduce the deviation from the desired output polarization.

It is further contemplated that, not every polarization element in a multi-element polarization controller 120 is controlled by both the feed-forward and feedback controls 101 and 102. Instead, only some of the polarization elements may be engaged under the feed-forward control 101 while other polarization elements are engaged under the feedback control 102.

For example, in FIGS. 5A and 5B, two polarization elements respectively orientated at angles 0 and 45 degrees, such as 510 and 520 in FIG. 5A or 512 and 522 in FIG. 5B, may be under the control of the feed-forward control 101.

Figure 7A:
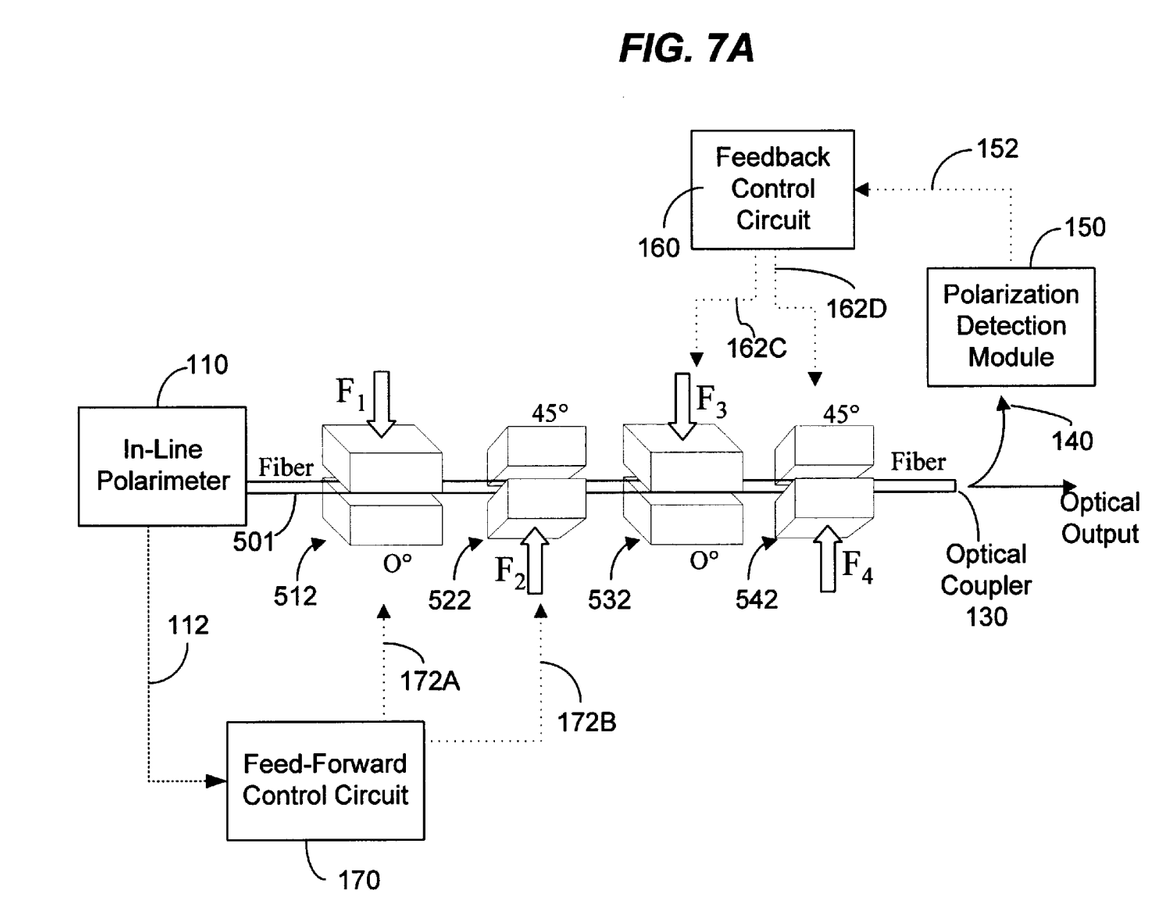
Figure 7B:
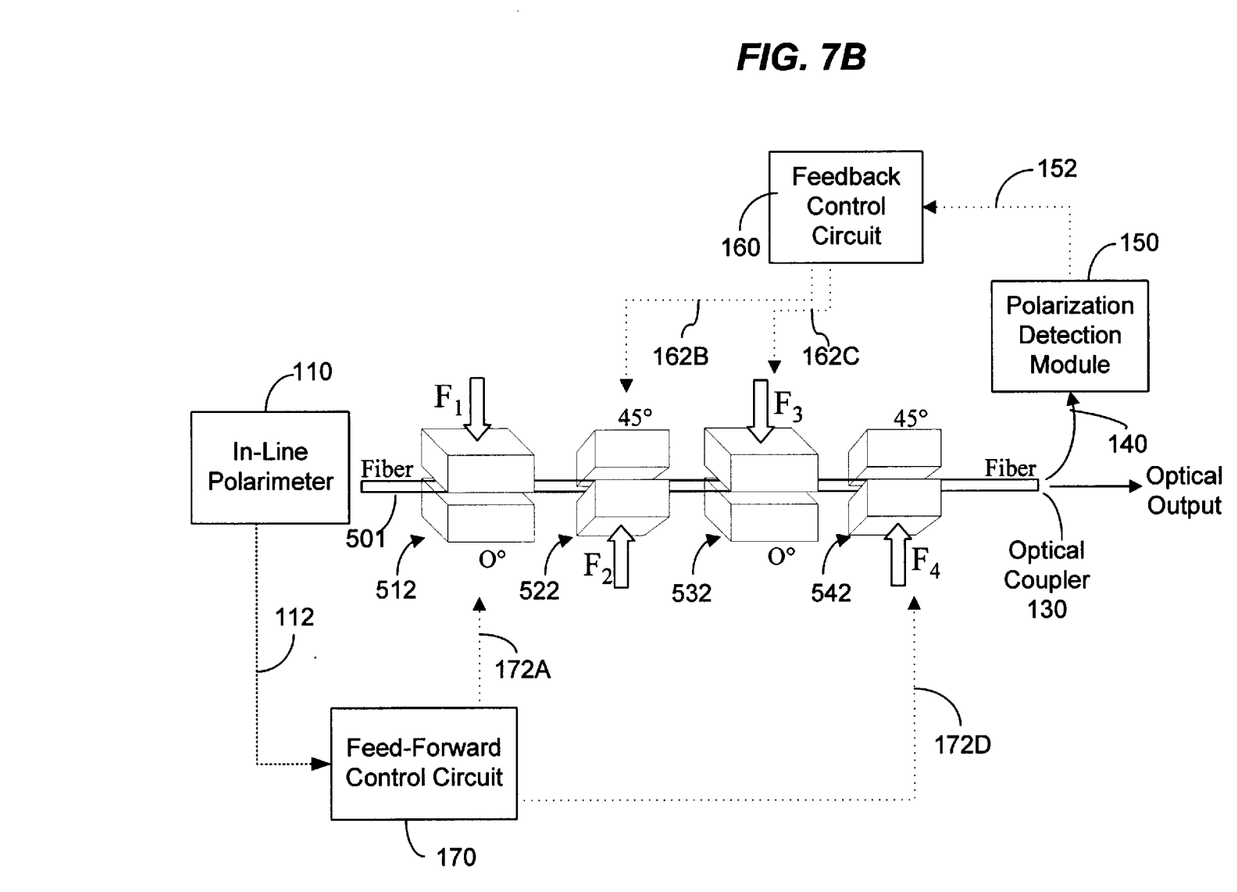

The other two elements, 530 and 540 in FIG. 5A or 532 and 542 in FIG. 5B, may be under the control of the feedback control 102. This is because two waveplates capable of producing variable retardations can produce all possible polarizations when the same polarization axes (e.g., the slow or fast axis) orientated at 45 degrees with respect to each other. Hence, in FIG. 5A, the elements 510 and 520 can rotate the input polarization approximately at the desired state by the feed-forward control 101 and the feedback control 102 can fine tune the elements 530 and 540 to accurately set the output polarization at the desired state. FIGS. 7A and 7B show two implementations of this embodiment based on the controller shown in FIG. 5B.

Although the present disclosure only includes a few embodiments, it is understood that various modifications and enhancements may be made without departing from the following claims.

What is claimed is:

1. A device, comprising:
   an optical path for transmitting an optical signal;
   a polarization controller in said optical path operable to adjust a polarization property of the optical signal in response to a control signal;
   a feed-forward control module responsive to an input polarization of the optical signal to control said polarization controller to change the input polarization to a desired output polarization; and
   a feedback control module controlling said polarization controller to reduce a deviation of said output polarization from said desired output polarization.

2. The device as in claim 1, wherein said polarization controller has a plurality of polarization elements cascaded in said optical path, each polarization element operable to adjust a polarization property of the optical signal in response to a control signal,
   wherein said feed-forward control module is operable to produce control signals to at least some of said plurality of polarization elements according to one of a plurality of pre-determined setting combinations in response to an input polarization of the optical signal so that said plurality of polarization elements operate in combination to change said input polarization to a desired output polarization, and
   wherein said feedback control module is operable to produce feedback control signals to adjust settings of at least some of said plurality of polarization elements to reduce a deviation of a measured output polarization from said desired output polarization.

3. The device as in claim 2, wherein each of said feed-forward control module and said feedback control module is coupled to control each of said plurality of polarization elements.

4. The device as in claim 2, wherein a polarization element under control of said feed-forward control module is not controlled by said feedback control module.

5. The device as in claim 2, wherein a polarization element under control of said feedback control module is not controlled by said feed-forward control module.

6. The device as in claim 1, wherein each polarization element is a birefringent element.

7. The device as in claim 6, wherein each polarization element has a principal polarization direction fixed relative to a principal polarization direction of another polarization element and has an amount of birefringence that is adjustable in response to a respective control signal.

8. The device as in claim 7, wherein each polarization element includes an electro-optic material.

9. The device as in claim 7, further comprising a fiber forming said optical path and wherein each polarization element includes a fiber squeezer.

10. The device as in claim 6, wherein each polarization element has a principal polarization direction that is adjustable relative to a principal polarization direction of another polarization element in response to a respective control signal and has a fixed amount of birefringence.

11. The device as in claim 10, wherein each polarization element includes a rotatable waveplate whose rotation is controlled by a respective control signal.

12. The device as in claim 10, wherein each polarization element includes a fiber coil which is rotatable in response to a respective control signal.

13. The device as in claim 10, wherein each polarization element includes an electro-optic material whose principal polarization direction varies in response to a respective control signal.

14. The device as in claim 1, wherein said polarization controller includes two birefringent wedges that are movable relative to each other to change a total retardation on the optical signal and that are rotatable around said optical path.

15. The device as in claim 1, wherein said polarization controller includes a fiber, and a fiber squeezer operable to apply a variable pressure on said fiber and to change a direction of said variable pressure around said fiber.

16. A device, comprising:
    a plurality of polarization elements cascaded to define an optical path for transmitting an optical signal, each polarization element operable to adjust a polarization property of the optical signal in response to a control signal;
    a feed-forward control module operable to produce control signals to at least some of said plurality of polarization elements according to one of a plurality of pre-determined setting combinations in response to an input polarization of the optical signal so that said plurality of polarization elements operate in combination to change said input polarization to a desired output polarization; and
    a feedback control module operable to produce feedback control signals to adjust settings of at least some of said plurality of polarization elements to reduce a deviation of a measured output polarization from said desired output polarization.

17. The device as in claim 16, wherein said plurality of polarization elements include four polarization elements, wherein said feed-forward control module controls two polarization elements which have respective slow axes rotated from each other by about 45 degrees and produce variable phase retardation values in response to respective control signals and said feedback control module controls the other two polarization elements which have respective slow axes rotated from each other by about 45 degrees and produce variable phase retardation values in response to respective control signals.

18. The device as in claim 17, further comprising a fiber forming said optical path and each polarization element includes a fiber squeezer engaged to said fiber at a designated location to cause a variable local birefringence.

19. A method, comprising:
    measuring input polarization of light input to an optical path;
    causing at least some of a plurality of polarization elements cascaded in the optical path to be controlled in response to the measured input polarization to rotate the input polarization to or near a desired polarization;

measuring the output polarization of light from the optical path; and causing at least some of the plurality of polarization elements to be controlled in response to the measured output polarization to reduce a deviation of the output polarization from the desired polarization.

20. The method as in claim 19, wherein the polarization elements that are controlled in response to the measured input polarization are not controlled by the measured output polarization.

* * * * *